(12) United States Patent
Jin et al.

(10) Patent No.: US 6,395,656 B1
(45) Date of Patent: May 28, 2002

(54) PROTECTIVE GLOVE WITH MULTIPLE LAYER CONSTRUCTION

(75) Inventors: L. Min Jin, Shanghai (CN); Stephen J. Franke, Chillicothe, MO (US)

(73) Assignee: Midwest Quality Gloves, Inc., Chillicothe, MO (US)

( * ) Notice: Subject to any disclaimer, the term of this patent is extended or adjusted under 35 U.S.C. 154(b) by 0 days.

(21) Appl. No.: 09/494,720

(22) Filed: Jan. 31, 2000

(51) Int. Cl.[7] .......................... B32B 27/04; B32B 5/02; B32B 5/26; D04H 1/08; A41D 19/00
(52) U.S. Cl. .......................... 442/159; 2/159; 2/161.3; 2/161.6; 2/161.8; 2/907; 428/36.1; 442/64; 442/66; 442/71; 442/90; 442/148; 442/304; 442/319; 442/320; 442/323; 442/326; 442/399
(58) Field of Search ..................... 2/159, 161.3, 161.6, 2/161.8, 907; 428/36.1; 442/64, 66, 71, 90, 148, 159, 304, 319, 320, 323, 326, 399

(56) References Cited

U.S. PATENT DOCUMENTS

| | | | | |
|---|---|---|---|---|
| 4,663,231 A | * | 5/1987 | Girgis et al | 428/378 |
| 5,942,452 A | * | 8/1999 | Daponte et al. | 442/382 |
| 6,265,191 B1 | * | 7/2001 | Mizusawa et al. | 435/177 |

OTHER PUBLICATIONS

Midwest Quality Gloves, Inc., 1988 Catalog, Excerpt of p. 2, Style #7103.
Midwest Quality Gloves, Inc., 1998 Catalog, Excerpt of p. 8, Style #7790, Community Press, Inc., Chillicothe, Missouri USA.

* cited by examiner

Primary Examiner—Terrel Morris
Assistant Examiner—Arti R. Singh
(74) Attorney, Agent, or Firm—Chase Law Firm, L.C.

(57) ABSTRACT

A multi-layer protective glove fabric comprises a base cloth layer, a second stretchable cloth layer overlying the base layer, a third latex layer coated on the base layer and a fourth wax layer over the third latex layer to prevent the latex coating layer from blooming. The method of manufacturing a protective glove with this multi-layer construction includes (1) heating a fabric layer at a first elevated temperature; (2) applying a viscous latex spreading compound over a surface of the fabric layer at a second, lower elevated temperature, to prevent the latex from penetrating the fabric layer but ensuring its adhesion to the fabric layer; (3) applying wax over the latex at least at the first elevated temperature, to prevent the latex from blooming; (4) adhering an opposed surface of the fabric layer to a second fabric layer to form the multi-layer fabric and (5) forming the multi-layer fabric into a glove.

7 Claims, 6 Drawing Sheets

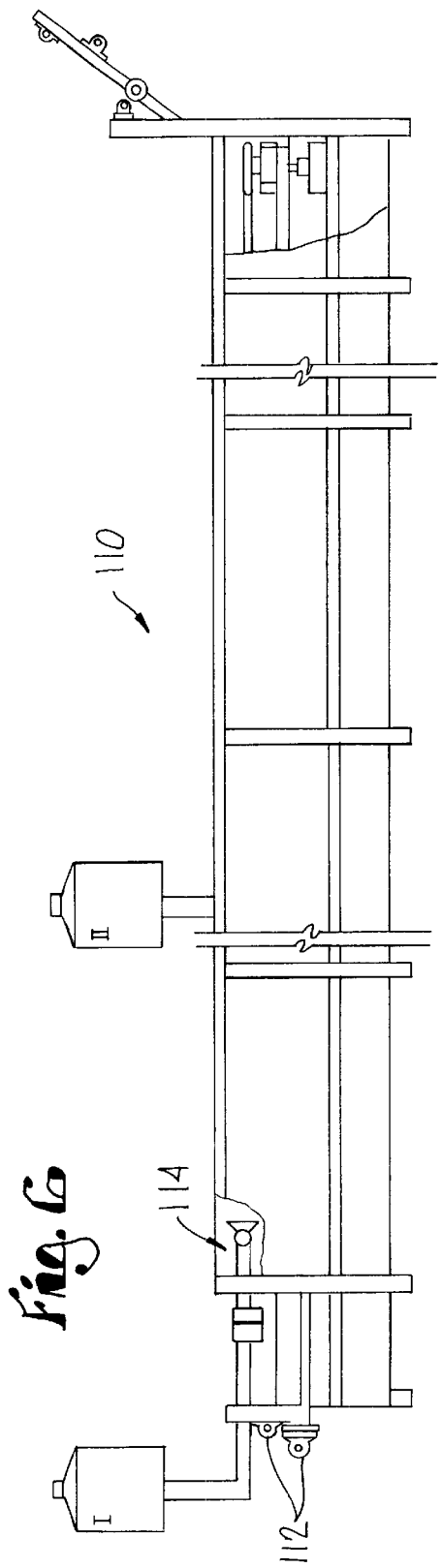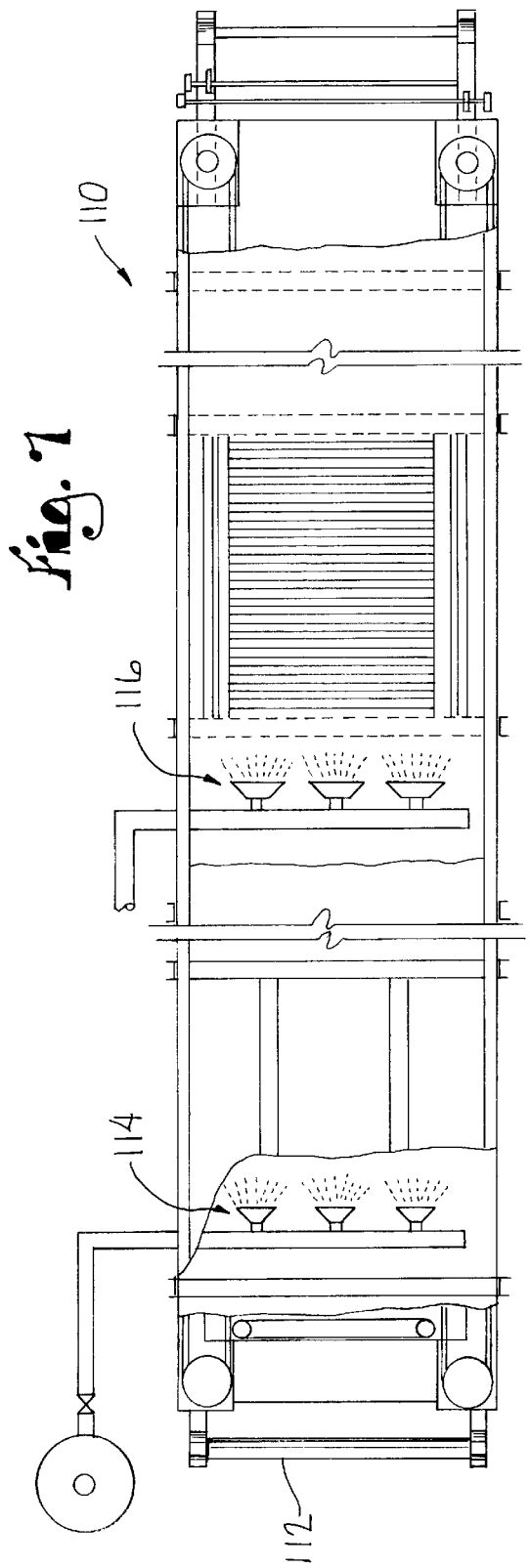

PROTECTIVE GLOVE WITH MULTIPLE LAYER CONSTRUCTION

FIELD OF THE INVENTION

This invention relates to a multi-layer cloth work glove having latex and wax coatings thereover and a method of making the same. More specifically, the thin latex coating adheres to but does not saturate the cloth layers and the wax layer prevents chemical blooming of the latex, to provide a comfortable, longer lasting work glove.

BACKGROUND OF THE INVENTION

Work gloves, such as the type used for carpentry, gardening or farm work, are typically formed from a knitted fabric made of cotton or polyester material. Some improvement in grip and wear is achieved by reinforcing portions of the glove fabric with plastic in a dot pattern or by application of a vinyl coating.

Prior known latex coating processes typically use multiple rollers or doctor knives, however, and are unable to produce a smooth, thin coating of uniform thickness. Other conventional pressurized spraying processes do not ensure uniform thickness or good adhesion between the latex coating and fabric layers. Known latex coated gloves also do not include a wax layer applied over the latex and thus are subject to chemical blooming (i.e., unattractive whitening).

SUMMARY OF THE INVENTION

Accordingly, it is a primary object of the subject invention to provide a multi-layer cloth work glove formed of thin and stretchable coated fabric that when sewn into gloves, is preferable for hand protection during most light-duty applications where tactile sensitivity and dexterity are important and acts as an effective barrier to many common mild liquids as well as pointed or sharp objects, such as insect bites, and keeps hands clean, dry and safe.

It is another primary object of the subject invention to provide a multi-layer cloth work glove including an outer surface coated with natural latex to improve the a glove's tensile strength, elongation and resistance to abrasions and cuts.

Another primary object of the subject invention is to provide a latex coated multi-layer work glove that further includes a layer of wax over the latex which acts as an effective barrier to atmospheric ozone and thus minimizes premature aging (blooming) of the latex.

Still another primary object of the subject invention is to provide a latex coated multi-layer work glove that includes a layer of wax over the latex, which provides a shine on the glove's outer surface and thus enhances the attractiveness of the glove.

Still another object of the subject invention is to provide a multi-layer work glove formed of two layers of fabric to provide a comfortable and stretchable glove for many light-duty applications.

Yet another object of the subject invention is to provide a multi-layer work glove including a bottom or inner layer of soft knitted jersey polyester fabric having a fleeced bottom surface to provide good perspiration absorption for long wearing comfort as well as effective insulation against cool outdoor weather.

Yet another object of the subject invention is to provide a multi-layer work glove including a second knitted interlock cotton fabric layer sandwiched between the latex layer and the fleeced fabric layer to serve as a reinforcing substratum and enhance the stretchability of the glove.

These objects are attained by providing a multi-layer protective glove fabric comprising a base cloth layer, a second stretchable cloth layer overlying the base layer, a third latex layer coated on the base layer and a fourth wax layer over the third latex layer to prevent the latex coating layer from blooming.

These objects may also be attained by providing a method of manufacturing a protective work glove with a multi-layer construction. The method includes (1) heating a fabric layer at a first elevated temperature; (2) applying a viscous latex spreading compound over a surface of the fabric layer at a second, lower elevated temperature, to prevent the latex from penetrating the fabric layer but ensuring its adhesion to the fabric layer; (3) applying wax over the latex at least at the first elevated temperature, to prevent the latex from blooming; (4) adhering an opposed surface of the fabric layer to a second fabric layer to form a multi-layer fabric and (5) forming the multi-layer fabric into a glove.

BRIEF DESCRIPTION OF THE DRAWINGS

FIG. 6 is a side view of the wax spraying machine in accordance with the present invention; and FIG. 7 is a top plan view of the wax spraying machine of FIG. 6;

DETAILED DESCRIPTION

Figure 11:
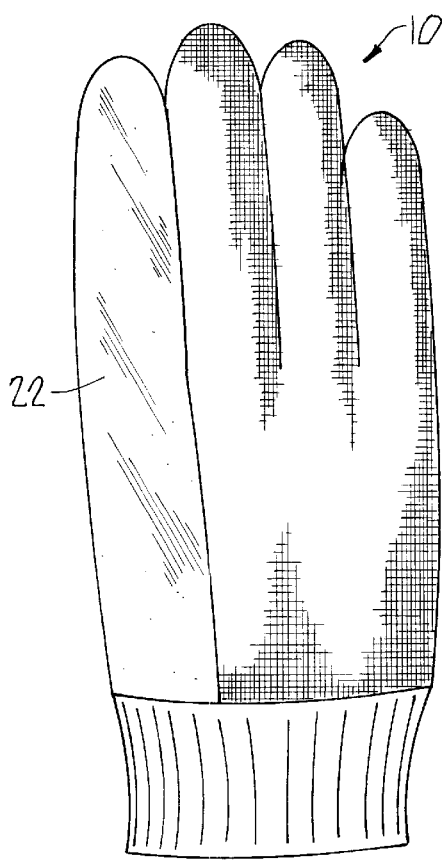
FIG. 11 is a top plan view of a multi-layer, protective work glove in accordance with the present invention.
Figure 12:
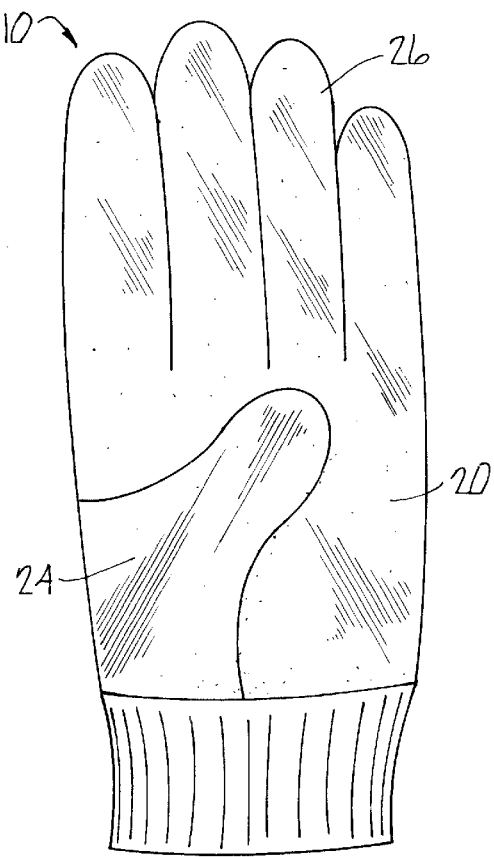
FIG. 12 is a bottom view of the glove of FIG. 11.
Figure 10:
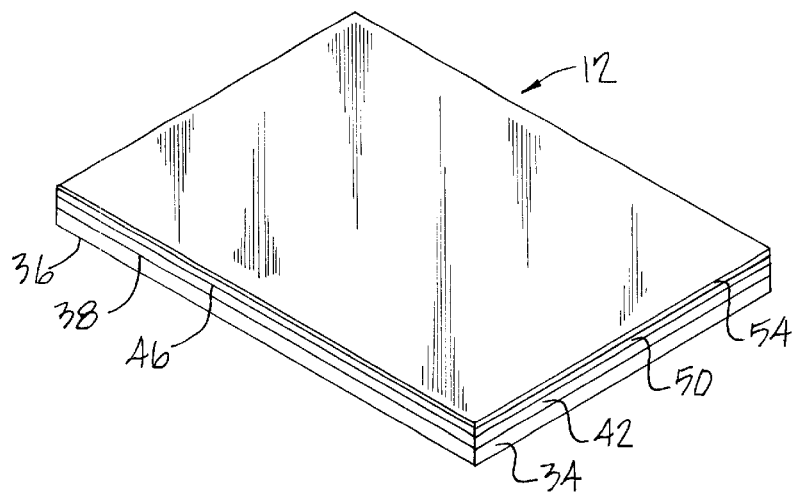
FIG. 10 is a perspective view of the multi-layer fabric of the present invention.

Protective work glove 10, as shown in FIGS. 11 and 12, is partly formed of the multi-layer fabric 12 of FIG. 10, in accordance with the present invention. Specifically, the glove 10 is formed with the multi-layer fabric 12 at the palm 20, first finger 22, thumb 24 and the palm side of the remaining fingers portion 26. This multi-layer fabric 12 provides an absorbent and durable coated fabric for fabrication into high-touch and high-stretch protective gloves, such as glove 10, which are comfortable and stretchable for wearing in many light-duty applications.

The backside of the remaining fingers portion 28 is preferably formed of a dual layer fabric, comprising the base layer 34 and second layer 42 as further discussed below. Of course, this unreinforced portion of the glove may be formed of any other type of fabric as desired.

The fabric 12 includes a base layer 34 of knitted jersey polyester fabric, preferably approximately 99 g/sq. m in density and 0.52 mm in thickness. Its bottom side 36 is fleeced and non-coated and thus offers perspiration absorption for longer wearing comfort and effective insulation in cool outdoor weather.

The top side 38 of the base layer 34 is laminated to a second layer 42 of knitted, stretchable interlock cotton fabric at its bottom side. This second layer 42 is preferably approximately 100 g/sq. m in density and 0.31 mm in thickness. The second cotton layer 42 is sandwiched between the fleeced polyester base layer 34 and a third latex layer 50, to serve as a reinforcing substratum and enhance the stretchability of the latex coating 50.

The second layer's top side 46 is evenly coated with the third layer 50 of smooth, vulcanized, natural latex, as discussed in detail below. The latex is approximately 200 g/sq. m in density and 0.2 mm in thickness (plus or minus 10%). Natural latex, such as this, outperforms most synthetic lattices in tensile strength, elongation and resistance against abrasion and cuts.

A fourth or top layer 54 of spray-on paraffin wax coating forms a thin, protective layer over the third latex layer 50. This layer 54 serves as an effective barrier against atmospheric ozone and hence minimizes premature aging of the latex. In addition, the waxy finish leaves an attractive lasting shine on the top surface of the fabric 12. As shown, fabric 12 is formed into glove 10 as discussed above. It may alternatively be formed into other articles requiring similar reinforced stretchability and comfort.

Latex Coating Process

Figure 1:
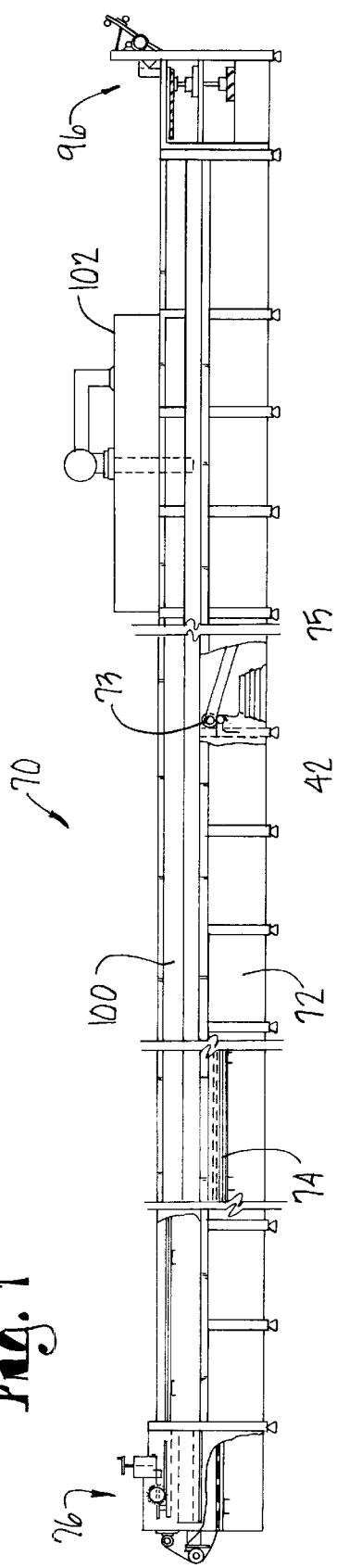
FIG. 1 is a side elevational view of the latex coating machine in accordance with the present invention with portions thereof broken away to show details with clarity.
Figure 2:
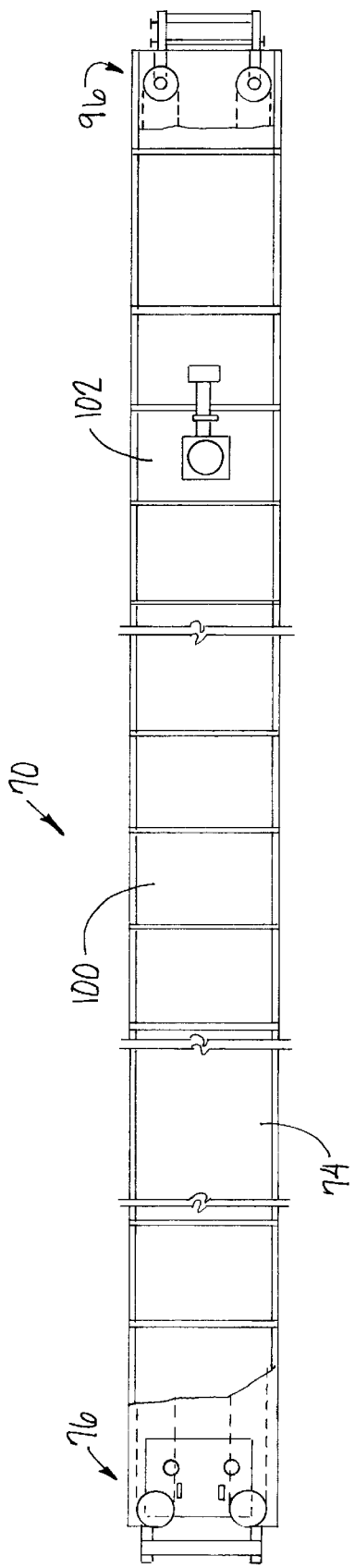
FIG. 2 is a top plan view of the latex coating machine of FIG. 1.

The latex coating 50 is applied over the top surface 46 of the second cotton layer 42 via latex coating machine 70, shown in FIGS. 1 and 2. The cotton layer 42 of fabric is fed from a rolled bale into a heated oven 72 via take up roller 73 on a conveyor belt 74 travelling at a controlled speed of preferably 1.6 m/min. The conveyor belt 74 is driven by transmission chain 75. Oven 72 subjects the fabric 42 to about 20 m of direct heating by wet steam up to a temperature of 60° C. The direct steam heating is carefully controlled so as not to destruct the delicate cellulose structure of the cotton yarn, which may otherwise promote strike-through of the latex coating 50. On the other hand, the surface tension of condensed vapor on the fabric at elevated temperature enables fast deposition of an even and smooth latex coating 50.

Figure 3:
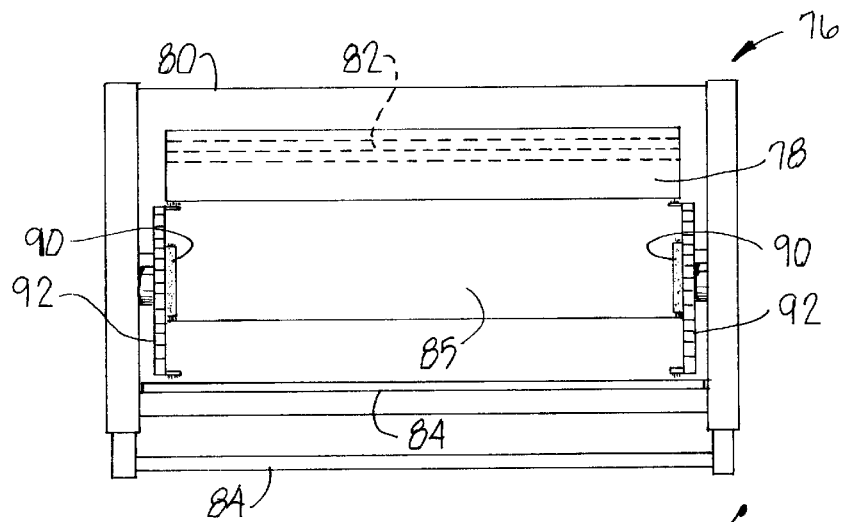
FIG. 3 is an enlarged, top plan view of the latex coating section of the latex coating machine of FIG. 1 with the knife adjuster removed for clarity.
Figure 4:
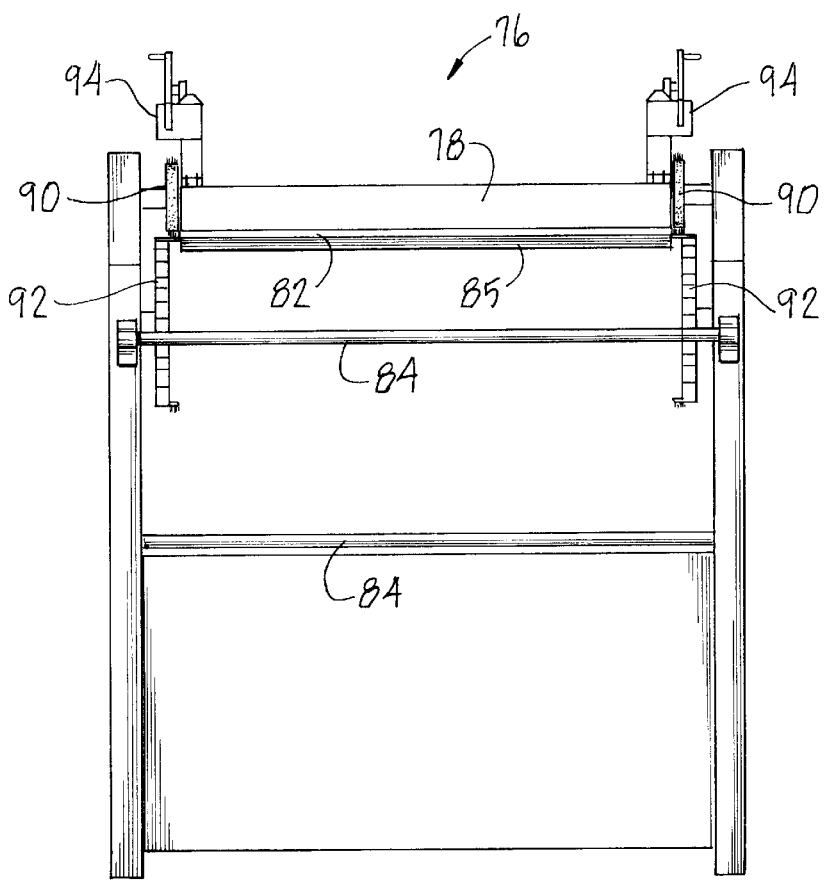
FIG. 4 is an elevational view of the latex coating section of the latex coating machine of FIG. 1.
Figure 5:
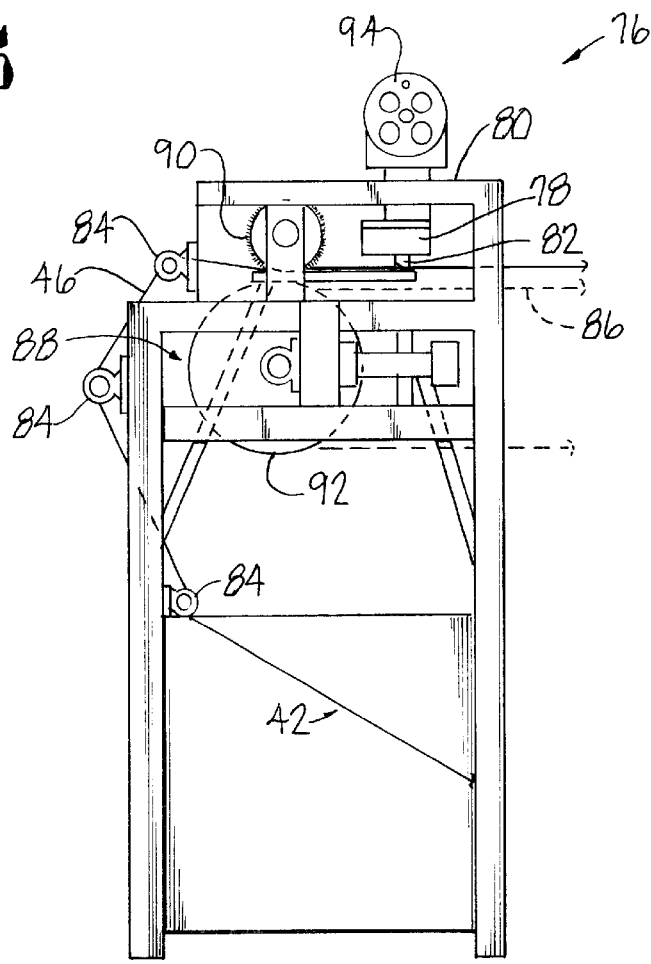
FIG. 5 is an enlarged side view of the latex coating section of the latex coating machine of FIG. 1.

The oven temperature is reduced from 60° C. to 45° C. before the cotton fabric 42 passes into the latex spreading section 76 of coating machine 70, as seen in detail in FIGS. 3–5. Rollers 84 move the fabric 42 into the latex coating section 76 and onto a feeding platform 85 of conveying belt 86. The brush wheel assembly 88 transfers the fabric 42 over the feeding platform 85 via the opposed brush wheels 90 and transmission or transfer wheels 92, to adjust the fabric tension for coating. The upper conveyor transmission device 96 drives the upper belt 74. Latex spreading section 76 is preferably 1500 mm by 150 mm and includes latex depositing limiter 78 for discharging (or pouring) and maintaining a constant mass of 7 kg of latex on the top surface 46 of the cotton fabric 42, which is preferably travelling at a constant speed of 1.6 m/min.

At the exit area 80 of this spreading section 76, a doctor knife 82 controls the uniform spreading of the latex coating thickness. The doctor knife 82 is adjustable by opposed adjusters 94.

At this latex coating section 76, the gravity force is translated into optimum pressure action on the latex coating mass to penetrate into the fabric without having the undesirable side effect of striking through, or penetrating the cotton fabric 42. On the other hand, the heated cotton fabric 42 at 45° C. is sufficient to coagulate the latex coating to ensure a secured adhesion between the latex coating and the cotton fabric layer 42. Thus this coating section 76 provides the optimum conditions for the desired coating requirements, the combination of controlled gravity force and elevated temperature.

The coated fabric is then conveyed to an upper drying oven 100 where it is first subjected to about 10 m of indirect heating up to 60° C. before an additional 10 m of heating up to 100° C. It is finally subjected to about 20 m of heating up to 120° C. to ensure complete drying and vulcanization.

The latex coated fabric is cooled by air cooler 102 on exit from the oven 100, prior to removing it to the wax coating machine 110 for spraying with emulsified wax.

Wax Coating Process

Figure 9:
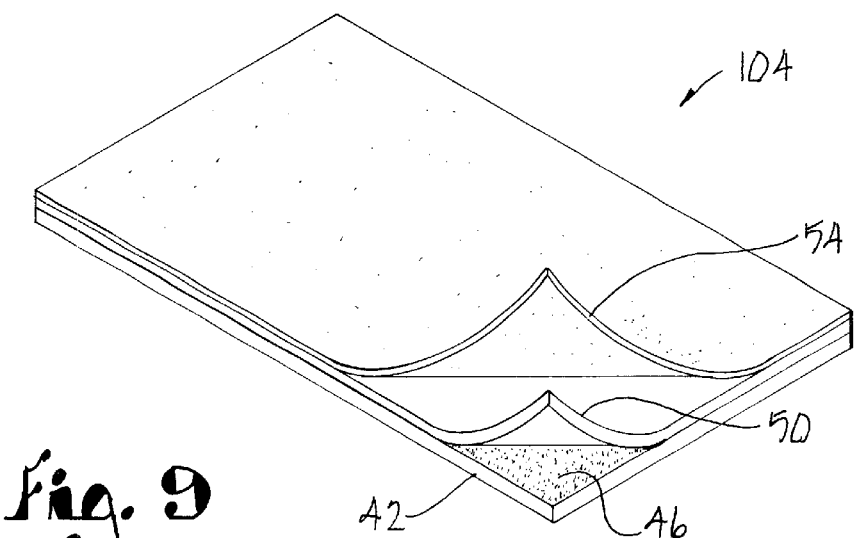
FIG. 9 is a perspective view of the latex coated fabric in accordance with the present invention, but without the wax layer thereover.

The wax layer 54 is applied over the latex layer 50 via wax coating machine 110, shown in FIGS. 6 and 7. The latex coated fabric passes over rollers 112 and is sprayed with a layer of diluted emulsified wax (a preferred mixing ratio of water: wax is 17:1) with pressurized guns 114 onto the latex surface 50 of the coated fabric at a travelling speed of preferably approximately 5 m/min. at a temperature of 60° C. An additional layer of emulsified wax in higher concentration (the preferred mixing ratio of water: wax is 8:1) is sprayed in a similar way by guns 116 at a conveying speed of approximately 5 m/min. and at a temperature of 80° C. After spraying, the fabric 104, as seen in FIG. 9, is subject to air cooling and drying before being baled for lamination to the base, polyester layer 34.

Fabric Lamination

Figure 8:
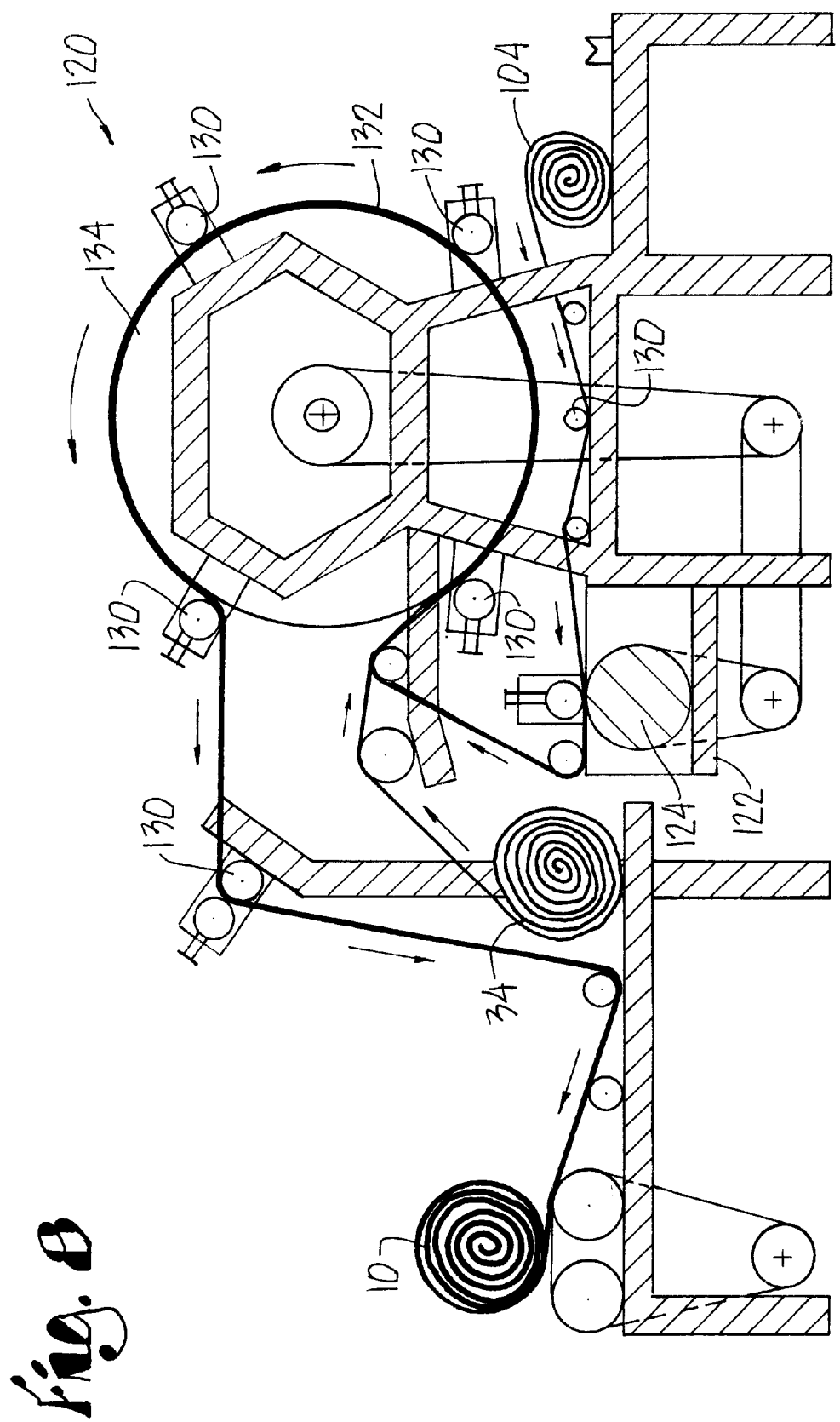
FIG. 8 is a side view of the laminating machine showing the latex coated fabric being adhered to the polyester fabric.

Fabric 104 is laminated to the top surface 38 of base polyester layer 34 via laminating machine 120, shown in FIG. 8. Laminating machine 120 includes glue reservoir 122 and glue take up roller 124 which applies an adhesive layer onto the bottom, non-coated surface 44 of the cotton fabric layer 42 of fabric 104. The adhesive is preferably industrial grade resin-agent type glue. Cotton fabric layer 42, at its bottom surface 44, is then compressed at 126 with the top surface 38 of the base polyester layer 34. The multi-layer fabric 10 is conveyed via transport rollers 130 through the oven 134 of glue drying drum 132 (in the direction of the arrows) for drying at 80° C. prior to being air cooled and rolled for fabrication as desired, such as into glove 12.

Having thus described the invention, what is claimed as new and desired to be secured by Letters Patent is as follows:

1. A multi-layer protective glove fabric, comprising:

a base cloth layer;

a second stretchable cloth layer overlying said base layer;

a third layer of latex coated on said second cloth layer; and a fourth wax layer over said third latex layer to prevent said latex coating layer from blooming.

2. A glove fabric as claimed in claim 1 wherein said base layer is knitted jersey polyester fabric having a fleeced bottom side for contact with a glove wearer's skin.

3. A glove fabric as claimed in claim 1 wherein said second layer is knitted interlock cotton fabric.

4. A glove fabric as claimed in claim 1 wherein said third layer is smooth, vulcanized natural latex.

5. A glove fabric as claimed in claim 4 wherein said third layer is about 2 mm in thickness.

6. A glove fabric as claimed in claim 1 wherein said fourth layer is a thin layer of spray-on paraffin wax.

7. A glove fabric as claimed in claim 1 wherein said third latex layer and said fourth wax layer are co-extensive and cover said first and second layers at a palm, first finger, thumb and palm side of the remaining fingers portion of said glove.

\* \* \* \* \*